Dec. 9, 1930.　　　　　V. DAHL　　　　1,784,090
CHRISTMAS TREE SUPPORT
Filed May 21, 1926　　2 Sheets-Sheet 1
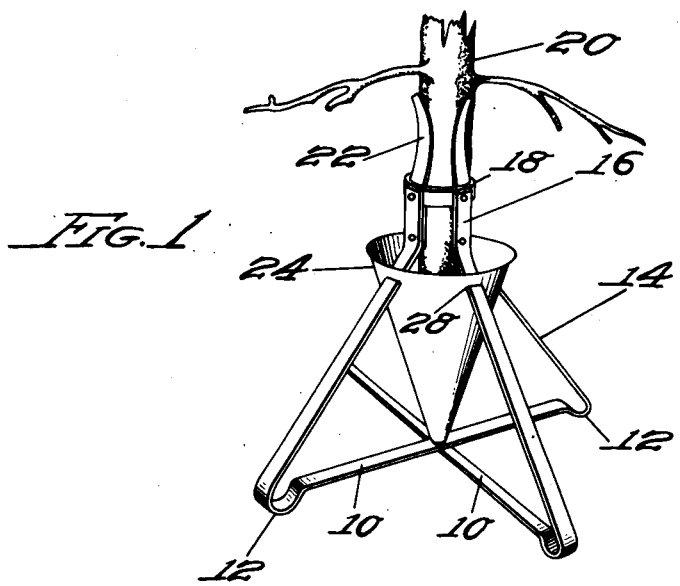
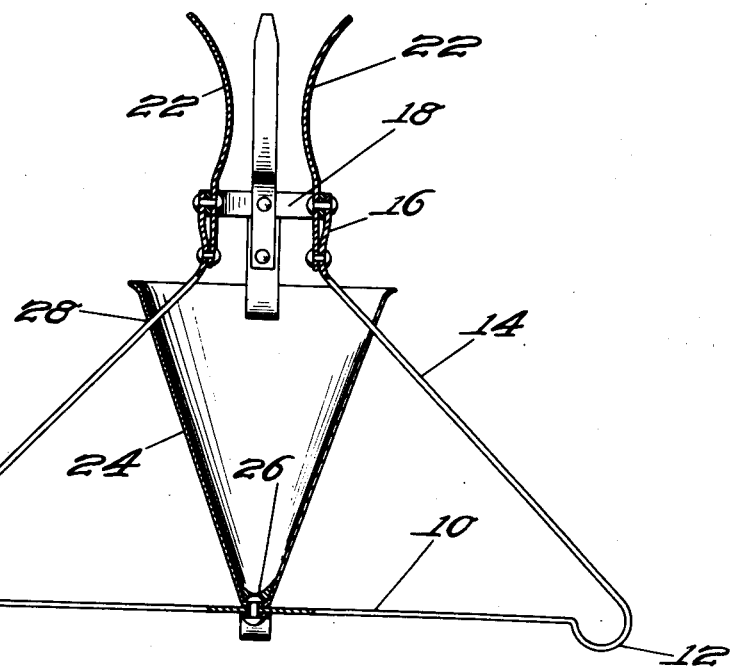
VICTOR DAHL
INVENTOR
PER
Albert J. Fihe
ATTORNEY Dec. 9, 1930.  V. DAHL  1,784,090
CHRISTMAS TREE SUPPORT
Filed May 21, 1926  2 Sheets-Sheet 2

VICTOR DAHL
INVENTOR

Patented Dec. 9, 1930

1,784,090

UNITED STATES PATENT OFFICE

VICTOR DAHL, OF SPOKANE, WASHINGTON

CHRISTMAS-TREE SUPPORT

Application filed May 21, 1926. Serial No. 110,677.

This invention relates to improvements in Christmas-tree supports, and has for one of its principal objects a ready and convenient means for supporting Christmas-trees in upright position for trimming and decorative purposes.

One of the important objects of this invention is the provision of a device for positively and adequately supporting Christmas-trees of various sizes in a desired upright position, while at the same time eliminating any possibility of accidental overturning of the tree by providing a suitable base therefor.

A still further important object of this invention is to provide, in a Christmas-tree support, a device which when not in use can be readily stored away in a small space, and which, being composed of sturdy material, will last indefinitely.

Another and still further important object of this invention is to provide, in combination, a support for Christmas-trees, which, in addition to securely gripping and sustaining the same, will further provide means for keeping the severed trunk moist so as to maintain the tree in a fresh and green condition for a considerable length of time.

Other and further important objects of the invention will be apparent from the disclosures in the accompanying drawings and following specification.

The invention, in a preferred form, is illustrated in the drawings and hereinafter more fully described.

In the drawings:

Figure 1 is a perspective view of the Christmas-tree support of this invention showing a tree as positioned therein.

Figure 2 is a vertical sectional view of the device shown in Figure 1.

As shown in the drawings:

Figure 3:
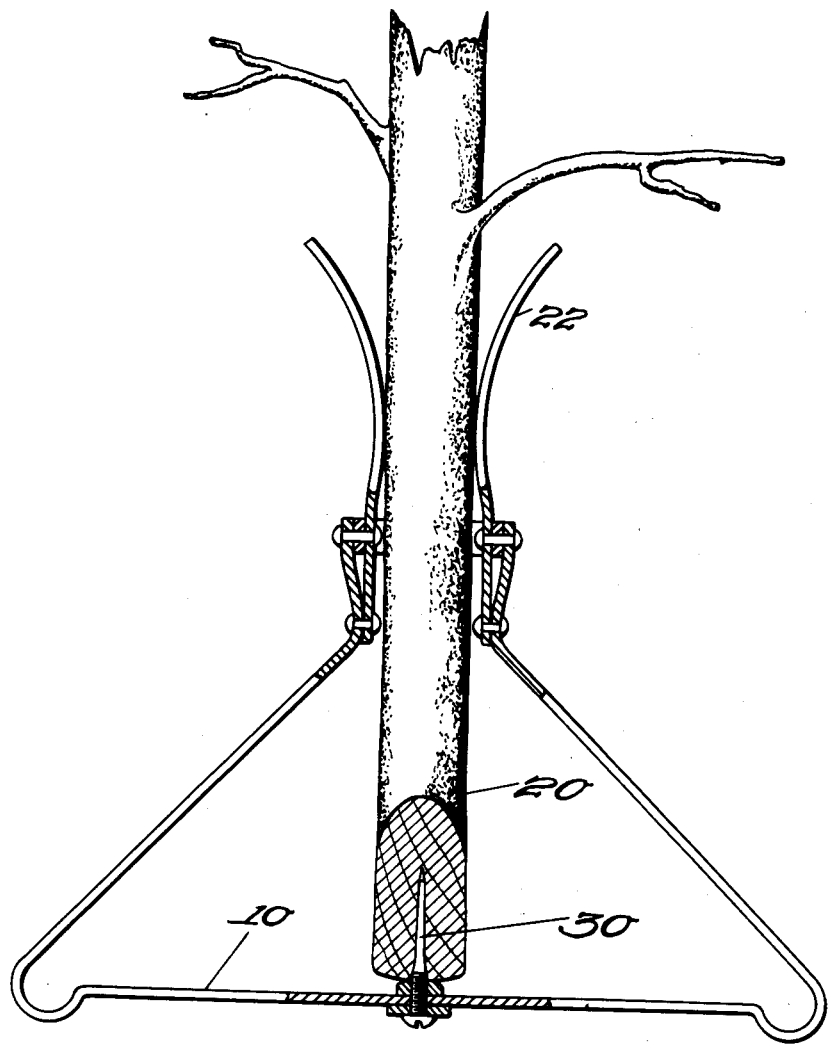
Figure 3 is a vertical sectional elevation illustrating a slight modification of the invention, with the tree in position.

The reference numerals 10 indicate generally a pair of horizontally extending base members formed of suitable strap iron or the like crossed at their center as illustrated, and provided with downwardly turned ends 12 to form rounded floor contacting supports. As shown, these members are then bent upwardly at an angle of approximately forty-five degrees to form outstanding brace elements 14, which in turn are again bent vertically at their ends 16, these ends being riveted, welded, or otherwise attached to a ring member 18 adapted to surround the trunk of a tree 20.

In order to make the device adaptable to different sizes of trees, a series of resilient clamping elements are provided in the form of conventionally curved upstanding members 22, as best shown in Figure 2, having their lower ends also attached by rivets, welding, or the like to both the ring 18 and to the upstanding ends 16 of the brace and base elements. This provides for a resilient positive gripping of the tree 20 through quite a range of sizes, and further, positively assures the desired upright position.

Positioned at the junction of the base members 10 is a combination water container and support for the end of the trunk of the tree 20, this container being designated by the numeral 24 and as shown, is in the form of an inverted cone, firmly soldered at its lower end 26 to prevent leakage. The upper end of the cone is fixed in position by having the brace members 14 pass through suitable slots 28 formed in the material of the cone. Water poured into this container 24 will keep the end of the tree trunk moist and at the same time the sloping sides of the container provide an adequate support for the end of the trunk and assure of its being maintained in a vertical position.

A slight modification of the invention is illustrated in Figure 3, wherein the water container 24 is omitted and a spike or the like 30 is positioned at the crossing of the base elements 10, adapted to extend upwardly into the trunk of the tree 20. It will be seen that in this manner is provided a positive means for supporting a tree in upright position, any danger of tipping or tilting being eliminated on account of the wide base acting at four points, the device itself being adaptable to many sizes of trees and not likely to damage the floor or any other surface upon which it is used.

I am aware that many changes may be made and numerous details of construction varied throughout a wide range without departing from the principles of this invention, and I therefore do not purpose limiting the patent granted hereon otherwise than as necessitated by the prior art.

I claim as my invention:

A Christmas-tree support, including in combination, a pair of crossed unitary base and brace elements each element comprising a horizontal portion, and two upwardly extending inwardly inclined portions bent at equal angles to the horizontal portion, an annular ring locking the upper portions of the brace elements together, a plurality of upwardly extending inwardly concave resilient gripping members mounted on the ring, and curved floor contacting portions formed in said base and brace elements, and means for maintaining the lower end of the tree trunk in position directly beneath the center of action of said resilient gripping elements, said means comprising a combination conical water container and tree butt support, the upper ends of the brace elements passing through slots adjacent the upper rim of said combination container and support.

In testimony whereof I affix my signature.

VICTOR DAHL.